US012642303B2

(12) United States Patent
Libine

(10) Patent No.: US 12,642,303 B2
(45) Date of Patent: Jun. 2, 2026

(54) SYSTEMS, DEVICES, AND METHODS FOR UNLOCKING AEROSOL-GENERATING DEVICES

(71) Applicant: PHILIP MORRIS PRODUCTS S.A., Neuchâtel (CH)

(72) Inventor: Rehouven Walter Libine, Lausanne (CH)

(73) Assignee: Philip Morris Products S.A., Neuchâtel (CH)

( * ) Notice: Subject to any disclaimer, the term of this patent is extended or adjusted under 35 U.S.C. 154(b) by 602 days.

(21) Appl. No.: 18/010,753

(22) PCT Filed: Jun. 22, 2021

(86) PCT No.: PCT/IB2021/055511
§ 371 (c)(1),
(2) Date: Dec. 15, 2022

(87) PCT Pub. No.: WO2021/260555
PCT Pub. Date: Dec. 30, 2021

(65) Prior Publication Data
US 2023/0248065 A1 Aug. 10, 2023

(30) Foreign Application Priority Data
Jun. 23, 2020 (EP) .................................... 20181780

(51) Int. Cl.
A24F 40/50 (2020.01)
A24F 40/46 (2020.01)
(Continued)

(52) U.S. Cl.
CPC .............. A24F 40/50 (2020.01); A24F 40/46 (2020.01); A24F 40/60 (2020.01); A24F 40/65 (2020.01);
(Continued)

(58) Field of Classification Search
None
See application file for complete search history.

(56) References Cited

U.S. PATENT DOCUMENTS

| | | |
|---|---|---|
| 9,763,478 B2 | 9/2017 | Cameron et al. |
| 2011/0072264 A1 | 3/2011 | McNulty |

(Continued)

FOREIGN PATENT DOCUMENTS

| | | |
|---|---|---|
| JP | 1990-2-032465 A | 2/1990 |
| JP | 2016-163265 A | 9/2016 |

(Continued)

OTHER PUBLICATIONS

Russian Office Action for RU 2022132389 issued by the Russian Patent and Trademark Office on Nov. 28, 2024; 34 pgs. including English Translation.

(Continued)

*Primary Examiner* — Philip Y Louie
*Assistant Examiner* — Madeleine P Delacruz
(74) *Attorney, Agent, or Firm* — Mueting Raasch Group

(57) ABSTRACT

A method comprising maintaining a database of user accounts and aerosol-generating devices associated with the user accounts. The method further comprises receiving an unlock request from a present aerosol-generating device to unlock an unlockable feature of the present aerosol-generating device. The unlock request comprises unique user-identification information identifying a present user account to be associated with the present aerosol-generating device. The method further comprises determining whether the present aerosol-generating device is already associated with any user accounts in the database, transmitting an unlock grant to the present aerosol-generating device to unlock the unlockable feature in response to determination that the present aerosol-generating device is not already associated (Continued)

with any user accounts in the database, and updating the database to associate the present user account with the present aerosol-generating device in response to determination that the present aerosol-generating device is not already associated with any user accounts in the database.

25 Claims, 7 Drawing Sheets

(51) Int. Cl.

| | |
|---|---|
| *A24F 40/60* | (2020.01) |
| *A24F 40/65* | (2020.01) |
| *G06F 21/31* | (2013.01) |
| *G06F 21/44* | (2013.01) |
| *G06F 21/62* | (2013.01) |

(52) U.S. Cl.
CPC .............. *G06F 21/31* (2013.01); *G06F 21/44* (2013.01); *G06F 21/629* (2013.01)

(56) References Cited

U.S. PATENT DOCUMENTS

| | | |
|---|---|---|
| 2015/0082427 A1 | 3/2015 | Ivanchykhin et al. |
| 2015/0181945 A1 | 7/2015 | Tremblay |
| 2017/0288867 A1 | 10/2017 | Collier et al. |
| 2020/0000143 A1 | 1/2020 | Anderson et al. |
| 2020/0085105 A1 | 3/2020 | Barbaric et al. |
| 2021/0011446 A1* | 1/2021 | Anderson ........ G06K 19/06028 |
| 2022/0279860 A1* | 9/2022 | Stockall .................. A24F 40/53 |
| 2022/0361585 A1* | 11/2022 | Moloney ................. A24F 40/51 |

FOREIGN PATENT DOCUMENTS

| | | |
|---|---|---|
| WO | WO 2013/149578 A1 | 10/2013 |
| WO | WO 2019/126805 A1 | 6/2019 |

OTHER PUBLICATIONS

Extended European Search Report for EP 20181780.6 issued by the European Patent Office, Oct. 29, 2020; 10 pgs.

International Search Report and Written Opinion for PCT/IB2021/055511 by the European Patent Office on Sep. 16, 2021; 16 pgs.

Japanese Office Action for JP 2022-576476 issued by the Japanese Patent Office on Jun. 5, 2025; 10 pgs. including English translation.

* cited by examiner

SYSTEMS, DEVICES, AND METHODS FOR UNLOCKING AEROSOL-GENERATING DEVICES

This application is the §371 U.S. National Stage of International Application No. PCT/IB2021/055511, filed 22 Jun. 2021, which claims the benefit of European Application No. 20181780.6, filed 23 Jun. 2020, the disclosures of which are incorporated herein by reference.

This invention relates to systems, devices, and methods for use in unlocking aerosol-generating devices.

Unauthorized use of aerosol-generating devices, for example, by underage users (e.g., users that are not lawfully permitted to use aerosol-generating devices) may be challenging to limit or restrict, especially, through resale of aerosol-generating devices between third parties such as users or improper retail outlets. For instance, if a first user purchases an aerosol-generating device from a normal, retail outlet, the first user may resell the purchased aerosol-generating device to a second user, who may be underage.

Additionally, unauthorized users may use an authorized users' aerosol-generating devices unbeknownst to the authorized users. For example, if an authorized user leaves their aerosol-generating device unattended, an unauthorized user may utilize the unattended aerosol-generating device without the authorized user's knowledge. Further, for example, if an authorized user loses their aerosol-generating device, an unauthorized user may find and utilize the lost aerosol-generating device without the authorized user's knowledge.

Aerosol-generating devices and systems related thereto may provide limited locking functionality. Published PCT patent application WO-2019/126805A1 describes vaporizers and vaporizer systems that can unlock a vaporizer to activate operation of the vaporizer based on the determined age of a user satisfying a threshold (e.g., legal age). The vaporizer can determine the age or receive a determination of the age from a server and/or application. Further, vaporizer pairing, locking, and/or unlocking may be accessible through an app logged into the user account linked to that vaporizer. Still further, a shared private key generated by the app may be used to lock/unlock the vaporizer, which transmitted to the vaporizer during a lock request. And still further, a vaporizer may be configured such that authorized ownership prohibits vaporizers owned by another account holder to be linked to another account without device owner explicitly releasing the vaporizer from the original account, thus making stealing more difficult by communicating that the vaporizer is paired to another account user. Yet still further, a vaporizer may be configured such that a vaporizer linking users may only link a specified number of vaporizers per a time period to prevent underage abusing.

U.S. Pat. No. 9,763,478 describes electronic vapor devices including a locking mechanism that may be controlled by at least one of voice profile module, password or passcode module, physical key, fingerprint scanner, iris identification scanner, third party device authorization, or other biometric data, for locking or unlocking. Further, a central server can receive both usage information and location information, access unified account and tracking information to determine that both the vapor device and an electronic communication device are associated with the same user.

U.S. Pat. App. Pub. No. 201 5/01 81 945 A1 describes an electronic vaping device that may allow a capability of the electronic vaping device to provide vapor to be altered (e.g., disabled, reduced, enabled, or increased) in some situations (e.g., to prevent unauthorized vaping by a child, teenager or other individual). A mobile communication device may run a software application that relates to an electronic cigarette and obtains authorization information from the user and enables the vapor-providing capability of the electronic cigarette if it determines that the authorization information is valid and indicative of the user being authorized to vape. The mobile communication device may send the authentication information (or a subset thereof) to a remote server (e.g., a web server) for authentication, which may be particularly useful when a third party is to have an influence on the user's ability to vape.

Ensuring the only authorized users are using the functionality of aerosol-generating devices may be challenging, especially, if authorized users resell their aerosol-generating devices. Additionally, various locking and unlocking solutions may be cumbersome for user and sellers to utilize. For example, good faith resell of aerosol-generating devices between users may be difficult if the unlocking and locking functionality is too overburdensome and complicated. Further, various locking and unlocking solutions may be difficult for manufacturers to provide. Still further, some solutions may not provide secure unlocking and locking functionality (for example, improperly encrypted unlocking and locking functionality) that may still be bypassed by sophisticated unauthorized users (for example, hackers) such that they may still be able to access aerosol-generating devices for which they are not authorized to do so.

It would be desirable to restrict underage users from using aerosol-generating devices in a simple, secure, and straightforward manner. Further, it would be desirable to restrict third parties from reselling unlocked aerosol-generating devices to unauthorized users. Still further, it would be desirable to provide a secure, unforgeable, unique, and single-use process to lock or unlock aerosol-generating devices using a cryptographic secret known only to the manufacturer's back-end server. Yet still further, it would be desirable to prevent someone unilaterally sending an unlocking command to aerosol-generating devices in order to maliciously unlock the aerosol-generating devices.

The present invention may be described as providing illustrative aerosol-generating devices, user interfaces devices, and servers for use in unlocking unlockable features of aerosol-generating devices when associated with a single user account. Further, the present invention may be described as further providing illustrative devices, systems, and methods for use in unlocking unlockable features of aerosol-generating devices using server-based, cryptographic authentication. Illustrative user interface devices may be used to initiate the unlocking processes between the aerosol-generating devices and the server, and data transmitted between the aerosol-generating devices and the server may be transmitted via the user interface devices. For example, a user may connect an illustrative aerosol-generating device to an illustrative server, for example, in a retail store or via a mobile application, and once the user has been verified, an unlock process may be initiated.

Additionally, the present invention may be also described as providing illustrative aerosol-generating devices, user interfaces devices, and servers for use in locking already-unlocked features of aerosol-generating devices (e.g., re-locking unlocked features) when disassociated or deregistered with a user account. Further, the present invention may be described as further providing illustrative devices, systems, and methods for use in locking already-unlocked features of aerosol-generating devices using server-based, cryptographic authentication. Illustrative user interface devices may be used to initiate the locking processes between the aerosol-generating devices and the server, and data transmitted between the aerosol-generating devices and the server may be transmitted via the user interface devices. For example, a user may connect an illustrative aerosol-generating device to an illustrative server, for example, in a retail store or via a mobile application, and once the user has been disassociated with the aerosol-generating device, a lock process may be initiated.

According to an aspect of the present invention, there is provided an illustrative aerosol-generating device comprising a controller, the controller comprising one or more processors. The controller is configured to provide an unlockable feature, transmit an unlock request to a server to unlock the unlockable feature, receive an unlock grant from the server in response to the transmitted unlock request, and unlock the unlockable feature in response to reception of the unlock grant.

According to another aspect of the present invention, there is provided an illustrative user interface device comprising a display comprising a graphical user interface to allow a user to interact therewith to unlock an unlockable feature of an aerosol-generating device, a communication interface to transfer data to and from the aerosol-generating device and a server, and a controller comprising one or more processors and operably coupled to the display and the communication interface. The controller is configured to receive an unlock request from the aerosol-generating device to unlock the unlockable feature, transmit the unlock request to the server, receive an unlock grant from the server in response to the transmitted unlock request, and transmit the unlock grant to the aerosol-generating device to unlock the unlockable feature.

According to another aspect of the present invention, there is provided an illustrative server for unlocking an unlockable feature of an aerosol-generating device comprising a communication interface to transfer data to and from an aerosol-generating device and a controller comprising one or more processors and operably coupled to the communication interface. The controller is configured to receive an unlock request from the aerosol-generating device to unlock the unlockable feature, and transmit an unlock grant to the aerosol-generating device to unlock the unlockable feature in response to the transmitted unlock request. Additionally, prior to initiation of an unlock or lock process, the illustrative server may request information from the aerosol-generating device to initiate the lock/unlock process, and if the server request is valid, the aerosol-generating device may send a lock or unlock request to the server.

Additionally, it is to be understood that the same or similar processes may be used herein to lock (e.g., re-lock) already-unlocked features of the aerosol-generating devices when, for example, a user becomes disassociated or deregistered from the aerosol-generating device.

The illustrative aerosol-generating device, user interface device, and server may advantageously interoperate, or "work together," to restrict underage users from using aerosol-generating devices in a simple, secure, and straightforward manner and to restrict third parties from reselling unlocked aerosol-generating devices to unauthorized users. In particular, for example, the transmission of unlock grants from one or both of a server and a user interface device to the aerosol-generating device may provide simple, secure, and straightforward unlocking of aerosol-generating devices for authorized users and may assist in restricting third parties from reselling unlocked aerosol-generating devices to unauthorized users. Further, it may be described that the present invention addresses the problem of ensuring that only a manufacturer of an aerosol-generating device, or electronic smoking device, can unlock a certain feature or functionality of the aerosol-generating device for users who have been verified as the aerosol-generating devices' proprietors before first use or before resale.

As described herein, the aerosol-generating device may include or have one or more unlockable features. For example, the aerosol-generating device may have a single unlockable feature. In this example, preferably, the unlockable feature of the aerosol-generating device is the ability to use the heating element to heat the aerosol-generating article to generate aerosol therefrom. In other words, the unlockable feature is the ability of a user to inhale, or puff, aerosol from the aerosol-generating device.

In other examples, the unlockable feature of the aerosol-generating device may be any of variety of different functionality provided by the aerosol-generating device. For instance, the unlockable feature may be the ability to configure one or more options associated with the aerosol-generating device such as puff concentration, colour of light emitting elements thereon, sound output options, heater temperature, display options, puff number limit, and haptic feedback (e.g., vibration output) options.

Thereof, the illustrative aerosol-generating device, user interface device, and server may allow one or more unlockable features of the aerosol-generating device to be unlocked. According to one aspect of the present invention, the illustrative aerosol-generating device includes a cavity to receive an aerosol-generating article, a heating element to heat the aerosol-generating article to generate aerosol therefrom, and a power supply operably coupled to the heating element.

It is to be understood that the illustrative aerosol-generating devices may be shipped from the manufacturer in a locked state such that the one or more unlockable features are locked prior to the initial purchase or sale. The illustrative methods, processes, and systems described herein may allow such one or more unlockable features to be unlocked only once strict verification procedures have been followed. Additionally, such illustrative aerosol-generating devices may be relocked prior to or on resale.

The aerosol-generating device may include a communication interface to transfer data to and from a user interface device and server and a controller comprising one or more processors. The communication interface may, for example, include at least a telemetry circuit and an antenna, for bidirectional communication with other devices such as user interface devices, servers, network devices, personal computers, and the like and with other networks such as the internet and the like. More specifically, data and commands may be transmitted and received during uplink or downlink telemetry between the user interface device and other devices and/or networks using the communication interface. In at least one embodiment, the communication interface is a wireless interface using one or more wireless (e.g., radio frequency) data transmission protocols such as, e.g., BLUETOOTH, WI-FI, any protocol in the ultra-high frequency (UHF) band, any protocol in the super high frequency (SHF) band, low frequencies, etc.

The controller of the aerosol-generating device may include one or more processors (e.g., microprocessors) that may operate with associated data storage, or memory, for access to processing programs or routines and one or more types of data that may be employed to carry out the illustrative methods. For example, processing programs or routines stored in data storage may include programs or routines for performing statistics, matrix mathematics, compression algorithms (e.g., data compression algorithms), standardization algorithms, comparison algorithms, or any other processing used to implement the one or more illustrative methods and processes described herein. Further, for example, processing programs or routines stored in data storage may include processes and functions to wirelessly transfer data and commands between the user interface device and an aerosol-generating apparatus and to wirelessly transfer data and commands between the user interface device and a server. The data storage, or memory, may be further configured to store data related to locking and unlocking one or more unlockable features of the aerosol-generating device and communicating unlock requests and lock grants between the aerosol-generating device, the user interface device, and the server, and any other data and/or formulas necessary to perform the processes and methods described herein.

In one or more embodiments, the aerosol-generating device and controller thereof may be described as being implemented using one or more computer programs executed on one or more programmable processors that include processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The computer program products used to implement the processes described herein may be provided using any programmable language, e.g., a high-level procedural and/or object orientated programming language that is suitable for communicating with a computer system. Any such program products may, for example, be stored on any suitable device, e.g., a storage media, readable by a general or special purpose program, controller apparatus for configuring and operating the computer when the suitable device is read for performing the procedures described herein. In other words, at least in one embodiment, the user interface device may be implemented using a non-transitory computer readable storage medium, configured with a computer program, where the storage medium so configured causes the computer to operate in a specific and predefined manner to perform functions described herein.

The exact configuration of the controller of the aerosol-generating device is not limiting and essentially any device capable of providing suitable computing capabilities and control capabilities to implement the illustrative methods described herein may be used. In view of the above, it will be readily apparent that the functionality as described in one or more embodiments according to the present invention may be implemented in any manner as would be known to one skilled in the art. As such, the computer language, the controller, or any other software/hardware which is to be used to implement the processes described herein shall not be limiting on the scope of the systems, processes or programs (e.g., the functionality provided by such processes or programs) described herein. The methods and processes described in this disclosure, including those attributed to the systems, or various constituent components, may be implemented, at least in part, in hardware, software, firmware, or any combination thereof. For example, various aspects of the techniques may be implemented within one or more processors, including one or more microprocessors, DSPs, ASICs, FPGAs, CPLDs, microcontrollers, or any other equivalent integrated or discrete logic circuitry, as well as any combinations of such components. When implemented in software, the functionality ascribed to the systems, devices, and methods described in this disclosure may be embodied as instructions on a computer-readable medium such as RAM, ROM, NVRAM, EEPROM, FLASH memory, magnetic data storage media, optical data storage media, or the like. The instructions may be executed by one or more processors to support one or more aspects of the functionality described in this disclosure.

As described herein, an unlock request is transmitted from the aerosol-generating device to a server. In one example, the unlock request may be transmitted directly to the server. More specifically, the aerosol-generating device may be wirelessly coupled to the internet so as to communicate with the server, and a user may use a user interface (e.g., a graphical user interface, buttons, etc.) on the aerosol-generating device to transmit the unlock request to the server via the internet. In another example, the unlock request may be transmitted from the aerosol-generating device to the user interface device, which, in turn, may transmit the unlock request to the server. The user interface device may be wirelessly connected to the internet so as to communicate with the server.

In one or more aspects of the present invention, the user interface device is a cellular telephone. In one or more aspects, the user interface device is a smart watch. Generally, the user interface device may be described as any electronic device including a display for providing a graphical user interface capable of being interacted with by a user. The user interface device may include a controller and a communication interface that are similar to that of the aerosol-generating device described herein.

In one or more aspects of the present invention, the illustrative user interface device comprises a display comprising a graphical user interface to allow a user to attempt to unlock the unlockable feature. Further, in one or more aspects of the present invention, the controller of the illustrative user interface device displays, on the graphical user interface, an unlockable feature graphical region and allows a user to select the unlockable feature graphical region to initiate the aerosol-generating device to transmit the unlock request thereto.

The display may be operatively coupled to the controller for the output of data via the display to depict and be used as a user interactable, graphical user interface. The graphical user interface and display may comprise a touchscreen. The graphical user interface may be described as being user interactable because the graphical user interface may be configured to allow a user to view and/or manipulate data on the display, to allow a user to interact with user interface device, and the like. The graphical user interface may be configured to perform any of the functionality described herein with respect to unlocking or locking one or more unlockable features of the aerosol-generating devices.

The unlock request, which may be sent from one or both of the aerosol-generating device and user interface device, includes data, or information, so as to provide the functionality for the server to unlock the aerosol-generating device. Similarly, a lock request, which may be sent from one or both of the aerosol-generating device and user interface device, includes data, or information, so as to provide the functionality for the server to lock the aerosol-generating device (e.g., when a user becomes disassociated or deregistered from the aerosol-generating device). The lock request may utilize the same or similar processes as described herein with respect to the unlock request. In one or more aspects of the present invention, the unlock request includes unique device-identification information identifying the aerosol-generating device and time-limited nonce information corresponding to the unlockable feature. In other words, the unlock request may contain both aerosol-generating device-unique information plus a time limited random value (nonce). The unique device-identification information may be information or data that identifies that aerosol-generating device and is unique to each specific aerosol-generating device. In other words, each aerosol-generating device may include unique device-identification information that is specific to only itself and no other aerosol-generating device. Thus, the unique device-identification information is different for each aerosol-generating device. The unique device-identification information may be a string of alphanumeric characters, a string of hexadecimal digits, etc. In one or more aspects of the present invention, the unique device-identification information is a serial number. The unique device-identification information is used to ensure, among other things, that received messages, or data transmission, are intended for the target aerosol-generating devices.

The time-limited nonce information corresponding to the unlockable feature may be any data, or information, capable of being used a single time in a cryptographical communication to the server to stop, or restrict, the use of the unlock request in the future. In other words, the use of a time-limited nonce information prevents replaying the unlock request, or message, to unlock the aerosol-generating device in the future. Further, it may be described that time-limited nonce information is an arbitrary number that can be used just once in a cryptographic communication and is often a random or pseudo-random number issued in an authentication protocol to ensure that old communications cannot be reused in "replay attacks." The time-limited nonce information may be valid for a validity time period. If an unlock grant, or message, received from the server is valid, and the time-limited nonce information has not expired (for example, the validity time period has not expired), then the aerosol-generating device may change the status of the unlockable feature (for example, unlock the unlockable feature).

For example, the validity time period may be 5 minutes. In this example, if the aerosol-generating device does not receive an unlock grant after 5 minutes, the time-limited nonce information sent in the unlock request will be determined to be invalid, and thus, an unlock grant, which may include the time-limited nonce information or derivative thereof, would be invalid. Conversely, if the unlock grant was received within the 5 minutes validity time period, the unlock grant would be valid and would result in allowing the aerosol-generating device to unlock the unlockable feature. In other examples, the validity time period may be greater than or equal to about 7 minutes, greater than or equal to about 10 minutes, less than or equal to about 60 seconds, less than or equal to about 30 seconds, less than or equal to about 20 seconds, or less than or equal to 5 seconds.

Thus, in one or more aspects of the present invention, the controller of the illustrative aerosol-generating device or illustrative user interface device is further configured to terminate unlocking the unlockable feature if the unlock grant is not received following a validity time period after the unlock request is transmitted to the server. Further, in one or more aspects of the present invention, the validity time period is less than or equal to 5 minutes.

After the server has received the unlock request from one or both of the aerosol-generating device and user interface device, the server may transmit an unlock grant to one or both of the aerosol-generating device and user interface device depending on whether the server determines whether or not to unlock the aerosol-generating device. The unlock grant may be transmitted, or communicated, to one or both of the aerosol-generating device and the user interface device in a secure and private manner. In one or more aspects of the present invention, the unlock grant is encrypted. For example, the unlock grant may be encrypted with a private key known only to the server. Further, the unlock grant may include, among other things, the unique device-identification information and the time-limited nonce information. The unique device-identification information may be used to ensure that the correct aerosol-generating device has received the unlock grant or message, and the time-limited nonce information may be used, as described herein, to determine whether the unlock grant has been received during the validity time period. In other words, the illustrative server may create, or generate, a lock/unlock message based on the information from the aerosol-generating device.

In one or more aspects of the present invention, the controller of the illustrative server is further configured to restrict a number of unlock grants transmitted to the aerosol-generating device. In one or more aspects of the present invention, the number of unlock grants for each unique aerosol-generating device is less than or equal to 1, less than or equal to 3, or less than or equal to 10.

In one or more aspects of the present invention, in response to reception of the unlock grant, the controller of the illustrative aerosol-generating device decrypts the unlock grant. The unlock grant may be decrypted by the aerosol-generating device using a public key located on all aerosol-generating devices. Thus, in one or more aspects of the present invention, the unlock grant is decryptable using a public key stored on the present aerosol-generating device. The use of asymmetric cryptography ensures that only the manufacturer's servers can lock/unlock an unlockable feature of the aerosol-generating devices and removes any reliance and knowledge of unique keys on each aerosol-generating device.

Further, in one or more aspects of the present invention, the controller of the illustrative aerosol-generating device determines whether the decrypted unlock grant comprises the unique device-identification information and the time-limited nonce information and unlocks the unlockable feature in response to a determination that the decrypted unlock grant comprises the unique device-identification information and the nonce information. Thus, the present invention advantageously provides secure, unforgeable, unique, and single-use processes to lock or unlock an aerosol-generating device's functionality using a cryptographic secret known only to a manufacturer's server (for example, "back-end" server), which may restrict or stop third parties from hacking and maliciously unlocking aerosol-generating devices.

The aerosol-generating device may also be temporarily locked by a user, for example, if the user knows that they will not be in possession of the aerosol-generating device for a period time. In this way, the user may protect the aerosol-generating device from being used by others when the user is away from the aerosol-generating device. In one or more aspects of the present invention, the controller of the illustrative aerosol-generating device or illustrative user interface device is further configured to temporarily re-lock the unlockable feature for a temporary locked time period. Further, in one or more aspects of the present invention, the temporary locked time period is less than or equal to 24 hours. Still further, in one or more aspects of the present invention, the controller of the illustrative aerosol-generating device or illustrative user interface device is further configured to allow a user to select an amount of time in the temporary locked time period and to initiate the temporary re-lock. For example, a graphical user interface may be provided by the user interface device such that a user may interact with the graphical user interface to select the amount of time in the temporary locked time period, and also initiate, or start, the temporary locked time period. In other examples, the interface of the aerosol-generating device itself (e.g., buttons, display, etc.) may be used to configure and initiate the temporary locked time period.

The illustrative server may perform one or more various processes to ensure that only a single user is associated with each aerosol-generating device, to restrict already-unlocked aerosol-generating devices from being used by unauthorized users, to limit a number of aerosol-generating devices unlockable by a single user. To do so, the server may include or utilize a database including user account information and aerosol-generating device information. According to an aspect of the present invention, there is provided an illustrative method (for example, for use by a server) comprising maintaining a database of user accounts and aerosol-generating devices associated with the user accounts. Each aerosol-generating device is only associable with a single user account. The illustrative method further comprises receiving an unlock request from a present aerosol-generating device to unlock an unlockable feature of the present aerosol-generating device. The unlock request comprises unique user-identification information identifying a present user account to be associated with the present aerosol-generating device. The illustrative method further comprises determining whether the present aerosol-generating device is already associated with any user accounts in the database and transmitting an unlock grant to the present aerosol-generating device to unlock the unlockable feature in response to determination that the present aerosol-generating device is not already associated with any user accounts in the database. The illustrative method still further comprises updating the database to associate the present user account with the present aerosol-generating device in response to determination that the present aerosol-generating device is not already associated with any user accounts in the database.

According to an aspect of the present invention, there is provided an illustrative computer program product comprising a non-transitory computer readable medium having program code portions stored thereon, the program code portions configured, when said program product is run on a computer or network device (for example, a server), to maintain a database of user accounts and aerosol-generating devices associated with the user accounts. Each aerosol-generating device is only associable with a single user account. The program code portions are further configured to receive an unlock request from a present aerosol-generating device to unlock an unlockable feature of the present aerosol-generating device. The unlock request comprises unique user-identification information identifying a present user account to be associated with the present aerosol-generating device. The program code portions are further configured to determine whether the present aerosol-generating device is already associated with any user accounts in the database and transmit an unlock grant to the present aerosol-generating device to unlock the unlockable feature in response to determination that the present aerosol-generating device is not already associated with any user accounts in the database. The program code portions are further configured to update the database to associate the present user account with the present aerosol-generating device in response to determination that the present aerosol-generating device is not already associated with any user accounts in the database.

According to another aspect of the present invention, there is provided an illustrative system (for example, a server) for unlocking unlockable features of aerosol-generating devices comprising a communication interface to transfer data to and from aerosol-generating devices and a controller comprising one or more processors and operably coupled to the communication interface. The controller is configured to maintain a database of user accounts and aerosol-generating devices associated with the user accounts. Each aerosol-generating device is only associable with a single user account. The controller is further configured to receive an unlock request from a present aerosol-generating device to unlock the unlockable feature. The unlock request comprises unique user-identification information identifying a present user account to be associated with the present aerosol-generating device. The controller is further configured to determine whether the present aerosol-generating device is already associated with any user accounts in the database and transmit an unlock grant to the present aerosol-generating device to unlock the unlockable feature in response to determination that the present aerosol-generating device is not already associated with any user accounts in the database. The controller is further configured update the database to associate the present user account with the present aerosol-generating device in response to determination that the present aerosol-generating device is not already associated with any user accounts in the database.

The described database may include a set of user data such as, for example, a user account associated with each verified user. In one or more aspects of the present invention, each user account of the database is associated with a person who is verified to be of legal age to use the aerosol-generating devices. The described database may further include a set of aerosol-generating device data such as, for example, unique device-identification information identifying each aerosol-generating device (for example, a serial number). The user account and unique device-identification information may be associated with each other in the database when a user unlocks one or more unlockable features of the aerosol-generating device upon, for example, purchase of the aerosol-generating device. Conversely, the user account and unique device-identification information may be disassociated with each other in the database when a user relocks one or more unlockable features of the aerosol-generating device upon, for example, sale or other disposal of the aerosol-generating device. In other words, the unique device-identification information (for example, a serial number) may be linked to only one user account and the aerosol-generating device can only be unlocked (e.g., the one or more unlockable features will unlock) when the unique device-identification information has been linked to a user account. Further, when the aerosol-generating device is unlinked with the associated user account, the aerosol-generating device will automatically lock (e.g., the one or more unlockable features will lock).

Through the use of the described database, the illustrative method, program code, and system may restrict or stop a user from unlocking a device already associated with another user thereby restricting locked aerosol-generating devices being unlocked by other users. Further, through the use of the described database, the illustrative method, program code, and system may limit the number of aerosol-generating devices any one single user may unlock thereby addressing the problem that an authorized buyer may buy multiple devices, unlock such multiple devices using their authorized account, and resell the unlocked devices to, for example, underage users. In other words, unscrupulous sellers would be prevented from buying hundreds of aerosol-generating devices, linking them to their account, and then selling the aerosol-generating devices to minors. Further, if a seller were to do this, the minors would not be able to use the user interface device application to configure such improperly acquired aerosol-generating devices (for example, since the minors would not be able to acquire a user account for use with the software application on the user interface device). Still further, in the event that an aerosol-generating device is confiscated from a minor, it would be possible to detect which account was used to unlock the aerosol-generating device that was sold to the minor.

In one or more aspects of the present invention, each user account of the database is only associable with an allowable number of aerosol-generating devices, and the illustrative method further comprises, the program code portions are further configured to instruct, or the controller is further configured to execute halting the transmission of the unlock grant and the update of the database if the present user account is already associated with the allowable number of aerosol-generating devices. Further, in one or more aspects of the present invention, the allowable number of aerosol-generating devices is less than or equal to 10. In other examples, allowable number of aerosol-generating devices less than or equal to 25, less than or equal to 15, less than or equal to 5, or less than or equal to 2. In other words, only a limited number of devices can be linked with an account.

As described herein, a user may relock their aerosol-generating device if, for example, they were to sell or otherwise dispose of the aerosol-generating device. Thus, in one or more aspects of the present invention, the illustrative method further comprises, the program code portions are further configured to instruct, or the controller is further configured to execute receiving a lock request from the present aerosol-generating device to re-lock the unlockable feature. The re-lock request may be substantially similar to the unlock request, except that the opposite result is desired. Thus, the re-lock request comprises the unique user-identification information identifying the present user account associated with the present aerosol-generating device. The database is then updated to disassociate the present user account from the present aerosol-generating device in response to reception of the lock request, and a lock grant may be transmitted to the present aerosol-generating device to re-lock the unlockable feature in response to reception of the lock request.

If an unauthorized user attempts to interface with or configure (for example, using a user interface device) an aerosol-generating device for which the user is not associated (thereby, unauthorized), a lock grant may be transmitted to the aerosol-generating device to lock the one or more unlockable features of the aerosol-generating device. In this way, unauthorized users may be blocked from using the aerosol-generating device for which they were trying to configure. For instance, in one or more aspects of the present invention, the illustrative method further comprises, the program code portions are further configured to instruct, or the controller is further configured to execute transmitting a lock grant to the present aerosol-generating device to re-lock the unlockable feature in response to a user interface device not associated with the present user account attempting to configure the present aerosol-generating device. Additionally, in some examples, prior to automatic locking of an aerosol-generating device and in response to an attempt at unauthorized access, a warning message may be transmitted to the user interface device or aerosol-generating device indicating to the user that they are not authorized to configure or interface with the aerosol-generating device since they are not associated therewith in the database. For instance, in one or more aspects of the present invention, the illustrative method further comprises, the program code portions are further configured to instruct, or the controller is further configured to execute transmitting a warning message to a user interface device in response to the user interface device not associated with the present user account attempting to configure the present aerosol-generating device.

The term "aerosol-producing article" or "aerosol-producing substrate" refers to a substrate capable of releasing, upon heating, volatile compounds, which can form an aerosol. The aerosols generated from aerosol-producing substrates of smoking articles according to the present disclosure may be visible or invisible and may include vapours (for example, fine particles of substances, which are in a gaseous state, that are ordinarily liquid or solid at room temperature) as well as gases and liquid droplets of condensed vapours. One example of a heated-type aerosol-generating article are the 1005 heat sticks, also known as MARLBORO HEAT-STICKS, from Phillip Morris International for use in an 1005, heat not burn, aerosol-generating device, also from Phillip Morris International.

The term "aerosol-generating device" refers to a device configured to use, or utilize, an aerosol-generating article that releases volatile compounds to form an aerosol that may be inhaled by a user.

The term "controller" and "processor" refers to any device or apparatus capable of providing suitable computing capabilities and control capabilities such as, e.g., microprocessors, digital signal processors (DSP), application specific integrated circuits (ASIC), field-programmable gate arrays (FPGA), equivalent discrete or integrated logic circuitry, or any combination thereof and of providing suitable data storage capabilities that includes any medium (e.g., volatile or non-volatile memory, a CD-ROM, magnetic recordable medium such as a disk or tape, etc.) containing digital bits (e.g., encoded in binary, trinary, etc.) that may be readable and/or writeable.

The term "communication interface" refers to any device or apparatus capable of providing suitable data communication capabilities between an aerosol-generating device and a user interface device such as, e.g., various telemetry circuits and antennas and may use one or more wired or wireless (e.g., radio frequency) data transmission protocols such as, e.g., BLUETOOTH, WI-FI, any protocol in the ultra-high frequency (UHF) band, any protocol in the super high frequency (SHF) band, low frequencies, or combinations thereof.

The term "database" refers to a collection, set, or repository of queryable, associable data such as, for example, a relational database.

The invention is defined in the claims. However, below there is provided a non-exhaustive list of non-limiting examples. Any one or more of the features of these examples may be combined with any one or more features of another example, embodiment, or aspect described herein.

Example Ex1: A method comprising:

maintaining a database of user accounts and aerosol-generating devices associated with the user accounts, wherein each aerosol-generating device is only associable with a single user account;

receiving an unlock request from a present aerosol-generating device to unlock an unlockable feature of the present aerosol-generating device, wherein the unlock request comprises unique user-identification information identifying a present user account to be associated with the present aerosol-generating device;

determining whether the present aerosol-generating device is already associated with any user accounts in the database;

transmitting an unlock grant to the present aerosol-generating device to unlock the unlockable feature in response to determination that the present aerosol-generating device is not already associated with any user accounts in the database; and updating the database to associate the present user account with the present aerosol-generating device in response to determination that the present aerosol-generating device is not already associated with any user accounts in the database.

Example Ex2: Computer program product comprising a non-transitory computer readable medium having program code portions stored thereon, the program code portions configured, when said program product is run on a computer or network device, to:

maintain a database of user accounts and aerosol-generating devices associated with the user accounts, wherein each aerosol-generating device is only associable with a single user account;

receive an unlock request from a present aerosol-generating device to unlock an unlockable feature of the present aerosol-generating device, wherein the unlock request comprises unique user-identification information identifying a present user account to be associated with the present aerosol-generating device;

determine whether the present aerosol-generating device is already associated with any user accounts in the database;

transmit an unlock grant to the present aerosol-generating device to unlock the unlockable feature in response to determination that the present aerosol-generating device is not already associated with any user accounts in the database; and update the database to associate the present user account with the present aerosol-generating device in response to determination that the present aerosol-generating device is not already associated with any user accounts in the database.

Example Ex3: A system for unlocking unlockable features of aerosol-generating devices comprising:

a communication interface to transfer data to and from aerosol-generating devices; and a controller comprising one or more processors and operably coupled to the communication interface, wherein the controller is configured to:

maintain a database of user accounts and aerosol-generating devices associated with the user accounts, wherein each aerosol-generating device is only associable with a single user account;

receive an unlock request from a present aerosol-generating device to unlock the unlockable feature, wherein the unlock request comprises unique user-identification information identifying a present user account to be associated with the present aerosol-generating device;

determine whether the present aerosol-generating device is already associated with any user accounts in the database;

transmit an unlock grant to the present aerosol-generating device to unlock the unlockable feature in response to determination that the present aerosol-generating device is not already associated with any user accounts in the database; and update the database to associate the present user account with the present aerosol-generating device in response to determination that the present aerosol-generating device is not already associated with any user accounts in the database.

Example Ex4: The method, computer program product, or system as set forth in any one of Ex1 to Ex3, wherein the aerosol-generating device comprises:

a cavity to receive an aerosol-generating article;

a heating element to heat the aerosol-generating article to generate aerosol therefrom; and a power supply operably coupled to the heating element, wherein the unlockable feature is the ability to use the heating element to heat the aerosol-generating article to generate aerosol therefrom.

Example Ex5: The method, computer program product, or system as set forth in any one of Ex1 to Ex4, wherein each user account of the database is only associable with an allowable number of aerosol-generating devices, wherein the method further comprises, the program code portions are further configured to instruct, or the controller is further configured to execute: halting the transmission of the unlock grant and the update of the database if the present user account is already associated with the allowable number of aerosol-generating devices.

Example Ex6: The method, computer program product, or system of Ex5, wherein the allowable number of aerosol-generating devices is less than or equal to 10.

Example Ex7: The method, computer program product, or system as set forth in any one of Ex1 to Ex6, wherein each user account of the database is associated with a person who is verified to be of legal age to use the aerosol-generating devices.

Example Ex8: The method, computer program product, or system as set forth in any one of Ex1 to Ex7, wherein the method further comprises, the program code portions are further configured to instruct, or the controller is further configured to execute:

receiving a lock request from the present aerosol-generating device to re-lock the unlockable feature, wherein the re-lock request comprises the unique user-identification information identifying the present user account associated with the present aerosol-generating device;

updating the database to disassociate the present user account from the present aerosol-generating device in response to reception of the lock request;

transmitting a lock grant to the present aerosol-generating device to re-lock the unlockable feature in response to reception of the lock request.

Example Ex9: The method, computer program product, or system as set forth in any one of Ex1 to Ex8, wherein the method further comprises, the program code portions are further configured to instruct, or the controller is further configured to execute: transmitting a lock grant to the present aerosol-generating device to re-lock the unlockable feature in response to a user interface device not associated with the present user account attempting to configure the present aerosol-generating device.

Example Ex10: The method, computer program product, or system as set forth in any one of Ex1 to Ex9, wherein the method further comprises, the program code portions are further configured to instruct, or the controller is further configured to execute: transmitting a warning message to a user interface device in response to the user interface device not associated with the present user account attempting to configure the present aerosol-generating device.

Example Ex11: The method, computer program product, or system as set forth in any one of Ex1 to Ex10, wherein the unlock request comprises: unique device-identification information identifying the aerosol-generating device; and time-limited nonce information corresponding to the unlockable feature.

Example Ex12: The method, computer program product, or system of Ex11, wherein the unique device-identification is a serial number.

Example Ex13: The method, computer program product, or system as set forth in any one of Ex1 to Ex12, wherein the unlock grant is encrypted.

Example Ex14: The method, computer program product, or system as set forth in any one of Ex1 to Ex13, wherein the unlock grant is decryptable using a public key stored on the present aerosol-generating device.

Reference will now be made to the drawings, which depict one or more aspects described in this disclosure. However, it will be understood that other aspects not depicted in the drawing fall within the scope and spirit of this disclosure. Like numbers used in the figures refer to like components, steps and the like. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components. The schematic drawings are not necessarily to scale and are presented for purposes of illustration and not limitation. The drawings depict one or more aspects described in this disclosure. However, it will be understood that other aspects not depicted in the drawing fall within the scope and spirit of this disclosure.

Examples will now be further described with reference to the figures in which.

Figure 1:
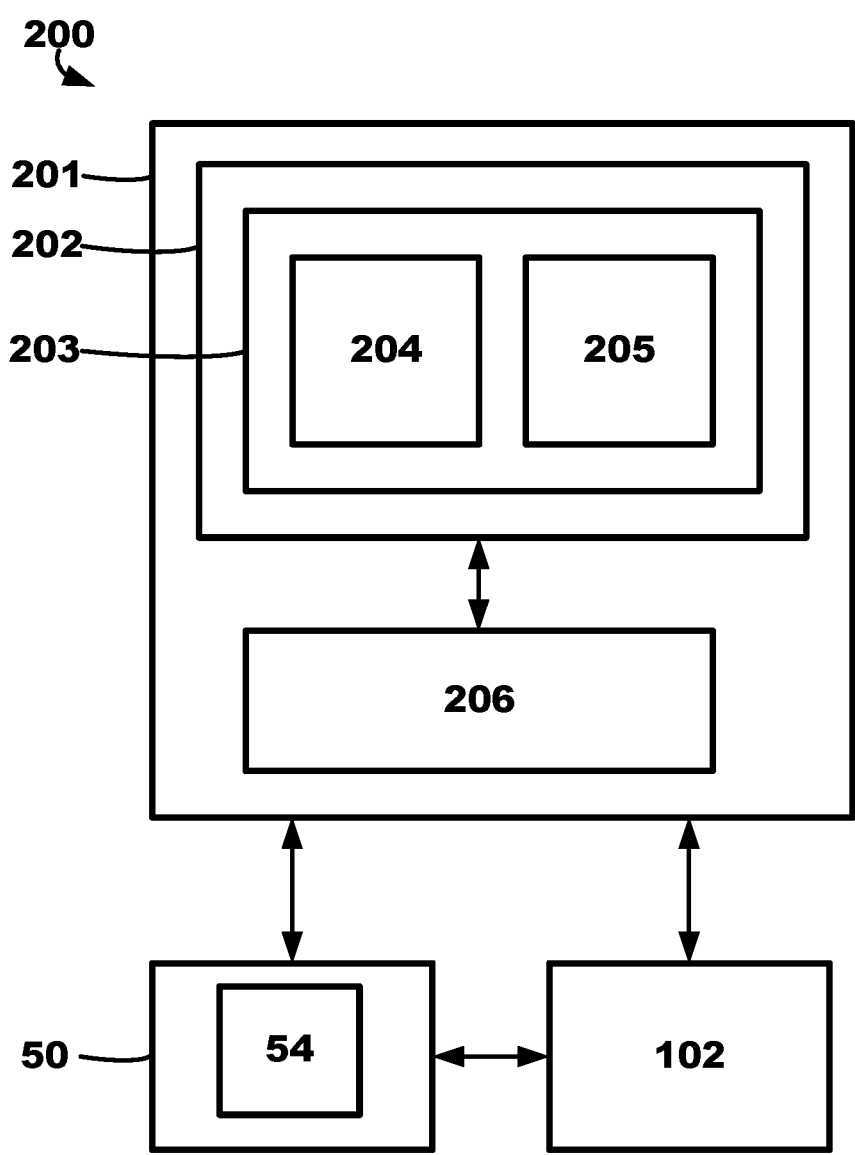
FIG. 1 is block diagram of an illustrative system 200 for use locking and unlocking one or more features of aerosol-generating devices 102.

With reference to FIG. 1, a functional scheme of an illustrative system 200 according to the present invention are depicted. The system 200 includes a user interface device 201, an aerosol-generating device 100, and a server 50. The user interface device 201, the aerosol-generating device 100, and a server 50 are physically separate devices but are operably coupled to each other for data communication therebetween as indicated by the bidirectional lines extending therebetween. The user interface device 201 is a general-purpose computer (in this example, a smart phone or tablet computer) and includes a controller 202 and associated data storage 203. The data storage 203 includes programs and routines 204 such as, for example, programs and routines for receiving and transmitting data, or messages, to and from the aerosol-generating device 100 and the server 50 and any other programs or routines to execute the illustrative methods and processes described herein. For instance, data, or messages, related to the locking and unlocking of one or more unlockable features of the aerosol-generating device 102 may be transmitted between the user interface device 201, the aerosol-generating device 102, and the server 50. The data storage 203 further includes data 205 such as unique user-identification information identifying a present user account to be associated with the present aerosol-generating device 102, unique device-identification information identifying the aerosol-generating device 102, and various temporary data utilized during the locking and unlocking processes described herein.

The user interface device 201 further includes a display 206 comprising a user-interactable, graphical user interface. The user interface device includes a communication connection to the internet, such as a wireless local area network (for example, Wi-Fi) transceiver. Still with reference to FIG. 1, the user interface device 201 may be a portable device that is configured to establish a connection to the server 50, to transfer/receive data such as, e.g., data related to the locking and unlocking of one or more unlockable features of the aerosol-generating device 102. Data can be transferred and/or received over the internet via the Wi-Fi transceiver of the user interface device 201.

Figure 2:
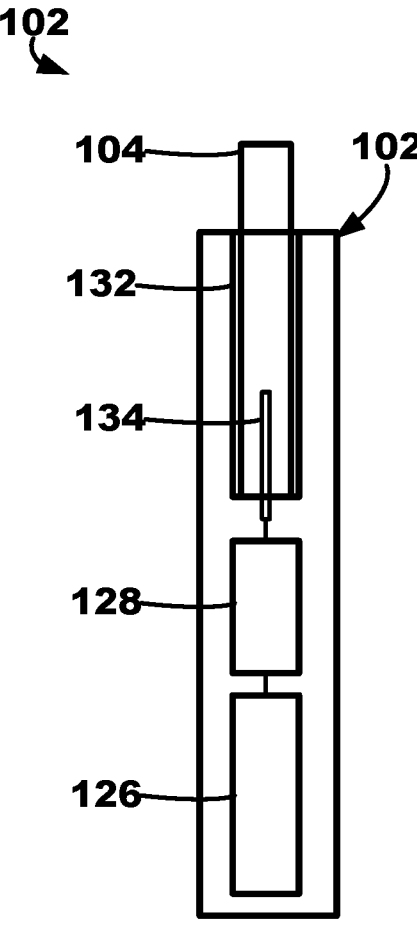
FIG. 2 is a schematic sectional view of an illustrative aerosol-generating device 102.

As noted herein, the system 200 may include aerosol-generating device 102 as described with more detail in reference to FIG. 2. Preferably, the aerosol-generating device 102 comprises a cavity 132 for receiving an aerosol-generating article 104 such as a heat stick and a heater 134, which is configured to provide a source of heat to the aerosol-generating article 104 thus producing inhalable aerosol. The aerosol-generating device 102 further includes a controller 128 comprising one or more processors and associated memory. The controller 128 may include functionality to lock or unlock various unlockable features of the aerosol-generating device 102. For example, the controller 128 may be able to lock or unlock the ability to use the heating element 134 to heat the aerosol-generating article 104 to generate aerosol therefrom.

The controller 128 may further include a communication interface such as, e.g., a wireless communication interface to, for example, communicate with the user interface device 201 and/or server 50 to facility the unlocking and locking functionality of the one or more unlockable features described herein. The communication interface of the controller 128 may preferably comprise a BLUETOOH interface or may include a WI-FI interface. The aerosol-generating device 102 further comprises a power supply 126 to, for example, provide electrical power to the aerosol-generating device 102 to, among other things, heat the heater to generate aerosol and communicate with the user interface device 201 and the server 50.

Figure 3:
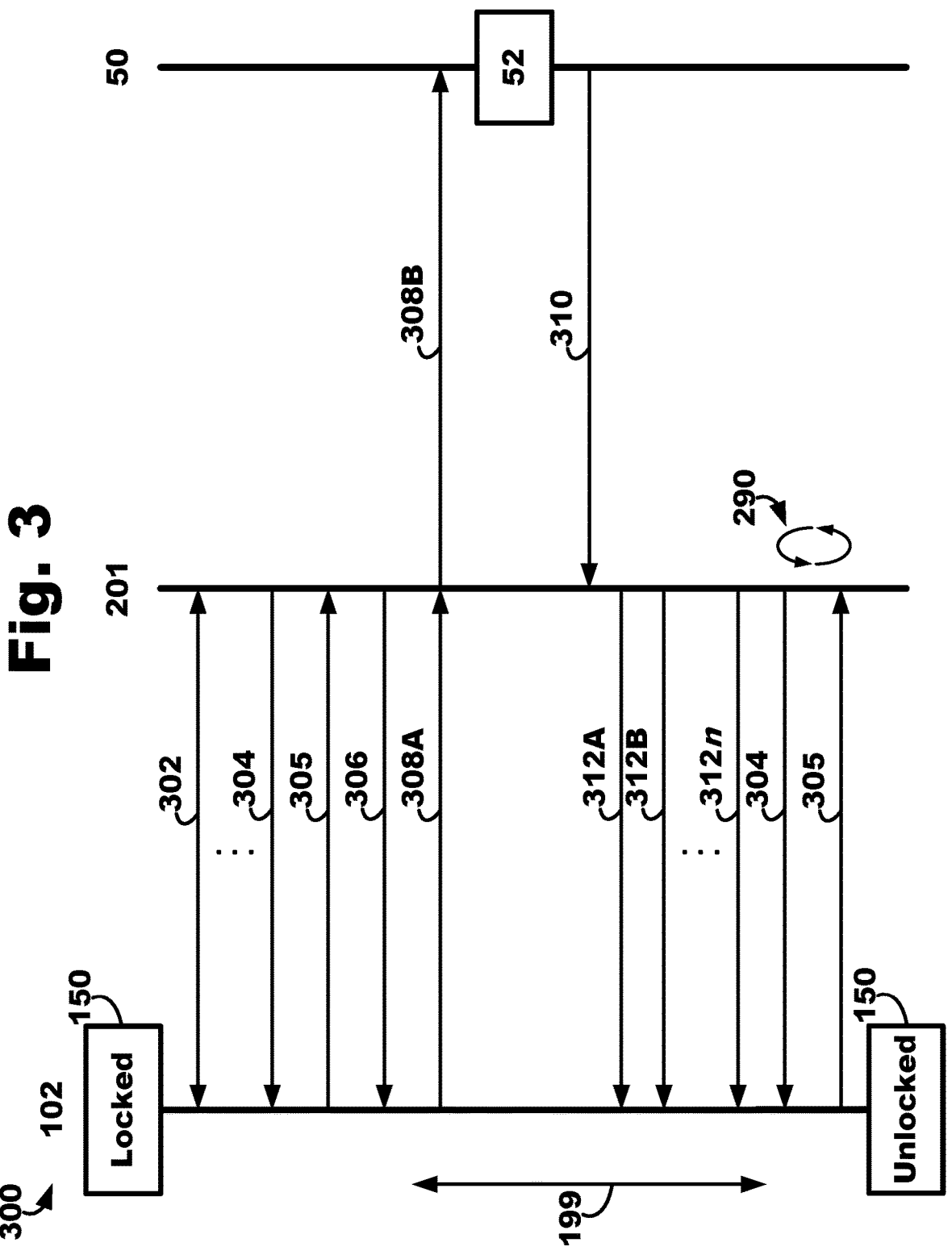
FIG. 3 is a sequence diagram of an illustrative unlocking process 300.

A sequence diagram of an illustrative unlocking process 300 is depicted in FIG. 3. The aerosol-generating device 102, indicated by the leftmost solid vertical line, may include a locked/unlocked status 150, and at the beginning of this example, the locked/unlocked status 150 indicates that the aerosol-generating device 102 is locked. A device discovery processes 302 may run continuously between the aerosol-generating device 102 and the user interface device 201, indicated by the middle solid vertical line, that may allow the user interface device 201 to discover and connect with the aerosol-generating device 102, regardless of whether the aerosol-generating device is locked or unlocked or whether the aerosol-generating device is paired with, or associated with, the user interface device 201. The device discovery processes 302 may allow the user interface device 201 to pair with, or become associated with, the aerosol-generating device 102. Further, the device discovery processes 302 may allow the aerosol-generating device 102 to be connected to the user interface device 201, or more specifically, the software application running on the user interface device 201 that provides the locking and unlocking functionality described herein. The device discovery processes 302 may exchange information such as unique device-identification information (for example, a serial number) identifying the aerosol-generating device 102.

The user interface device 201 may query 304 the aerosol-generating device 102 to determine the present locked/unlocked status 150 of the aerosol-generating device 102. In one aspect, the query 304 may be a read command to request the data of a portion of memory of the aerosol-generating device 102 that indicates the present locked/unlocked status 150. In return, the aerosol-generating device 102 may return 305 the locked/unlocked status 150, an error message, or a busy message. In other words, the user interface device 201 or server 50 may request 304 the current status of the unlockable feature it wishes to lock or unlock, and the aerosol-generating device 102 may reply 305 with, among other things, the present locked/unlocked status 150.

The unlock process 300 may be initiated by the aerosol-generating device 102, the user interface device 201, or the server 50. The server 50 is indicated by the rightmost solid vertical line. Regardless of where the unlock process 300 is initiated, an unlock request must ultimately be transmitted to the server 50. In this example, the user interface device 201 initiates the unlock by issuing a read command 306 to the aerosol-generating device 102. In response, the aerosol-generating device 102 may send an unlock request 308A to the user interface device 201. The unlock request 308A may include, at least, time-limited nonce information and unique device-identification information. The time-limited nonce information may be a 16-byte integer. Additionally, the unlock request 308A may include a response size. In one or more aspects, it may be described that if the server 50 or user interface device 201 wishes to change the present locked/unlocked status 150, it requests the aerosol-generating device's 102 unique information such as its serial number and a unique value (for example, nonce value). In response, the aerosol-device 102 will send such information to one or both of the user interface device 201 25 and the server 50.

The user interface device 201 may receive the unlock request 308A and modify the unlock request 308A to, for example, include unique user-identification information identifying a present user account to be associated with the present aerosol-generating device 102. The modified unlock request 308B may be transmitted to the server 50.

The server 50 may include and maintain a database 54 as shown in FIG. 1. The database 54 may include a collection of user account information and device information, which may be utilized by the lock and unlock processes described herein. Although it may be described that the server 50 includes or has the database 54, it is to be understood that the database 54 may not physically be located on the server 50, and instead, may be on another server which the server 50 has access thereto. Additionally, the server 50 may not be a single computer server, and instead, may be a plurality of servers or server clusters. Additionally, the server 50 may simply a virtualized server running on various hardware platforms or cloud services.

The server 50 may receive the unlock request 308A and perform one or more processes with respect thereto 52 according to the present disclosure. For example, the server 50 may determine whether the aerosol-generating device 102 is already associated with another user 52 (for example, by querying the database 54). If it is determined the aerosol-generating device 102 is already associated with another user based on the unique device-identification information, the server 50 will not issue an unlock grant. Further, for example, the server 50 may determine whether the present user has already been associated with the allowable number of aerosol-generating devices 52 (for example, by querying the database 54). If it is determined that the present user has already been associated with the allowable number of aerosol-generating devices, the server 50 will not issue an unlock grant (e.g., halt the transmission of an unlock grant). Still further, the server 50 may update the database to associate the present user account with the present aerosol-generating device 102 if the present aerosol-generating device is not already associated with any user accounts in the database.

If the server 50 determines that the aerosol-generating device 102 is to be unlocked, the server 50 may generate an unlock grant 310 and transmit the unlock grant 310 to the user interface device 201. Additionally, in some examples, the unlock grant 310 could be transmitted directly to the aerosol-generating device 102 from the server 50. The unlock grant 310 may be encrypted using the private key known only to the server 50 and may include the time-limited nonce information and unique device-identification information. In other words, the server 50 creates a string (i.e., the unlock grant) consisting of a lock/unlock request, the aerosol-generating device's unique information, the nonce, and some additional padding, then encrypts the string using an asymmetric private key, and sends the result (i.e., the encrypted string) to one or both of the user interface device 201 and aerosol-generating device 102. The user interface device 201, in turn, may transmit the unlock grant 312 to the aerosol-generating device 102. In this example, the user interface device 201 transmits the unlock grant 312 multiple times as indicated by the letters following the unlock grant 312A, 3128, . . . 312n.

If the unlock grant 312 is not received within the validity time period 199, the unlock process 300 will expire, the aerosol-generating device 102 will not be unlocked, and the unlock process 300 will need to be reinitiated. In this example, the unlocked grant 312 was received within the valid time period 199 resulting in the aerosol-generating device 102 becoming unlocked as indicated by the present locked/unlocked status 150. In other words, the aerosol-generating device 102 may initiate a validity timer during which the unlock process must complete, and if the procedure is unsuccessful or not completed within the validity time period, the current process 300 is invalidated and must be restarted from the beginning.

For example, the aerosol-generating device 102 may receive the encrypted string (i.e., unlock grant) and decrypt it using a public key of the server 50, which may be stored on all aerosol-generating devices 102. The aerosol-generating device 102 may verify if the decrypted string respects a predefined format and contains the original nonce, the unique device information, and requests a change in status of the present locked/unlocked status 150 associated with the nonce.

If such conditions are met and the validity time period has not expired, then the aerosol-generating device 102 changes the present locked/unlocked status 150.

Additionally, the user interface device 201 may continue to periodically pull 290 on the status of the aerosol-generating device 102 querying 304 the aerosol-generating device 102 to determine the present locked/unlocked status 150 thereof. In particular, the periodically pulling 290 may include a query 304 from the user interface device 201 and, in response, the locked/unlocked status 150, an error message, or a busy message, may be returned 305 from the aerosol-generating device 102.

It is to be understood that although an unlock process 300 is depicted in FIG. 3, that a lock or relock process may be performed in a similar manner. For example, the user interface device 201 may initiate a lock request that gathers the same or similar information such as the unique device-identification information, unique user-identification information, time-limited nonce information, etc. to send to the server 50. In turn, the server 50 will issue a lock grant to lock the aerosol-generating device 102.

Figure 4:
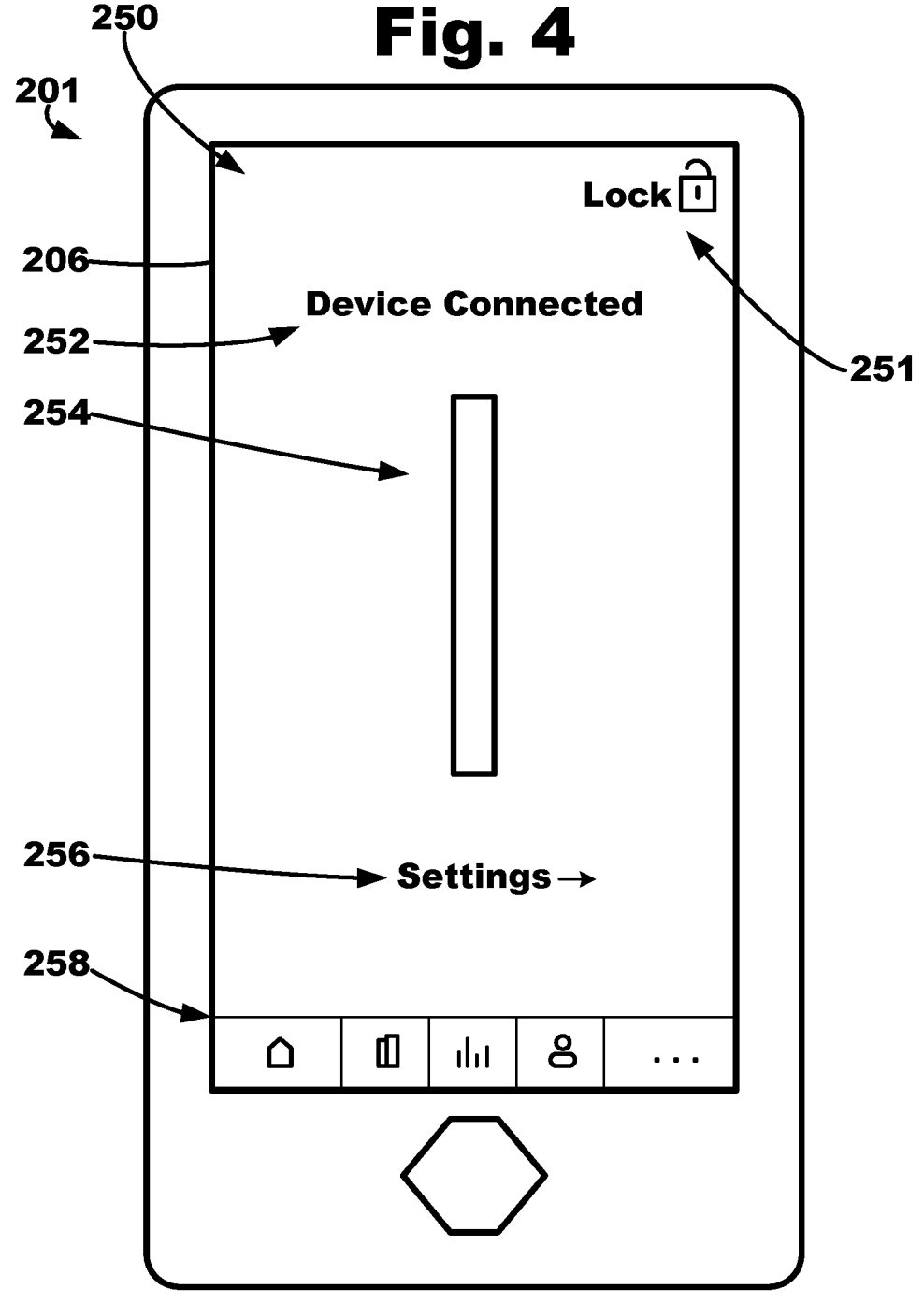
FIGS. 4-7 are views of an illustrative graphical user interface 250 for use with a user interface device 201 to lock and unlock an aerosol-generating device.

The illustrative user interface device 201 including a display 206 depicting a graphical user interface 250 is shown in FIGS. 4-7. In FIG. 4, the graphical user interface 250 includes a lock status graphical element 251, which is configured to indicate whether the connected aerosol-generating device is in a locked or unlocked state (e.g., one or more unlockable features of the aerosol-generating device are in a locked or unlocked state). As shown in FIG. 4, the lock status graphical element 251 depicts an unlocked state as shown by a graphical representation of an unlocked padlock. Thus, the connected aerosol-generating device is unlocked, and if the unlockable feature is the ability to use the heating element to heat the aerosol-generating article to generate aerosol therefrom, then a user may use the aerosol-generating device to use the heating element to heat the aerosol-generating article to generate aerosol therefrom.

The graphical user interface 250 further includes device status message 252 that indicates whether an aerosol-generating device is connected. As shown, the device status message 252 reads "Device Connected," which indicates that an aerosol-generating device is presently connected to the user interface device 201 such that the aerosol-generating device may be configured or locked/unlocked using the user interface device 201. Conversely, the device status message 252 may read "Device Not Connected" to indicate that an aerosol-generating device is not presently connected to the user interface device 201. The graphical user interface 250 further includes aerosol-generating device graphical representation 254 depicts the associated aerosol-generating device to, for example, indicate the type of aerosol-generating device that is presently connected to the user interface device 201.

Figure 5:
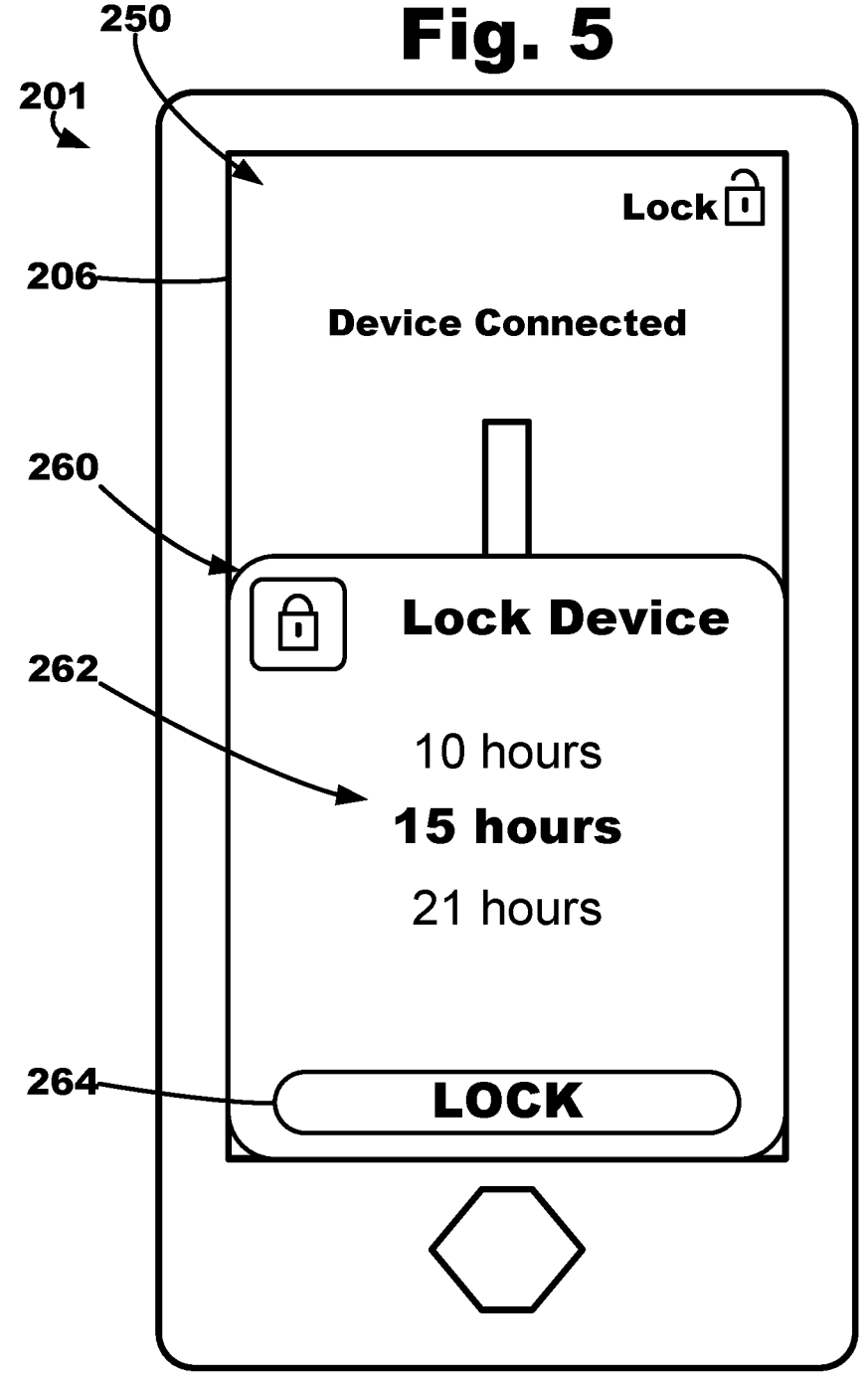

The graphical user interface 250 of the user interface device 201 may be used to configure the aerosol-generating device and lock/unlock the unlockable features of the aerosol-generating device. To do so, a user may select (e.g., touch, click etc.) the change settings graphical area 256, which is depicted as the word "Settings" with an arrow pointing to the right. Furthermore, the graphical user interface 250 may include a toolbar region 258 that includes multiple selectable areas to traverse a graphical user interface 250 (e.g., to traverse the aerosol-generating device software application running on the graphical user interface 250). For example, the toolbar region 258 may include, among other things, a devices area and a user account area. The devices area may allow a user to configure a connected aerosol-generating device, and the user account area may allow a user to configure their user account A user may wish to temporarily lock their aerosol-generating device using the user interface device 201. To do so, a user may select the lock status graphical element 251 or the text located proximate thereto that reads "Lock." Upon selection of the lock status graphical element 251, a lock graphical region 260 may be depicted in the graphical user interface 250 as shown in FIG. 5. A user may use the lock graphical region 260 to select an amount of time in or for the temporary locked time period. In this example, a locked time period selection area 262 may be displayed, which includes a list of scrollable time values. 10 hours, 15 hours, and 21 hours are presently shown, with 15 hours being presently selected as indicated as being centered and bolded. In one aspect, a user may "swipe up" or "swipe down" on the locked time period selection area 262 to display other time values arranged in a consecutive fashion. Once the user has found and selected the desired locked time period using the locked time period selected area 262, a user may select the lock initiation graphical element 264 to initiate the temporary lock or re-lock.

Additionally, a user may wish to lock their aerosol-generating device using the user interface device 201 prior to resell or transfer of their aerosol-generating device, which may also be completed by selecting the lock status graphical element 251 and using the lock graphical region 260 to lock the aerosol-generating device an indefinite period of time until another user attempts to unlock the aerosol-generating device using an authorized user account. For example, instead of selecting a locked time period, the user may use locked time period selection area 262 to select an indefinite time period until another authorized user unlocks the aerosol-generating device.

Figure 6:
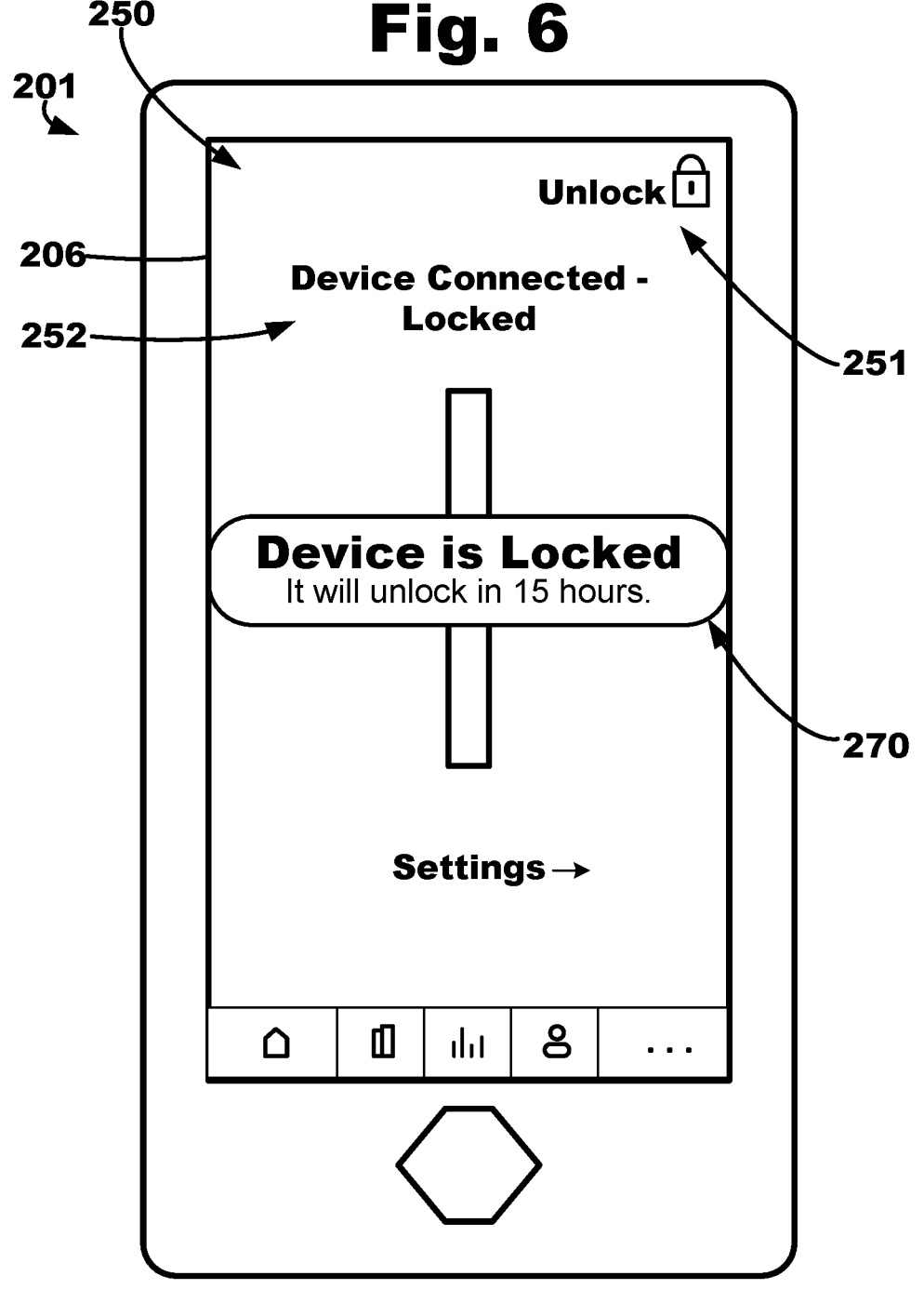

Upon selection of the lock initiation graphical element 264 to initiate the temporary lock or re-lock, a temporary lock status message 270 may be displayed on the graphical user interface 250 as shown in FIG. 6. The temporary lock status message 270 may indicate that the associated aerosol-generating device is locked textually. As shown, the temporary lock status message 270 reads "Device is Locked." Additionally, temporary lock status message 270 may also indicate the amount of time remaining during the temporary lock time period. As shown, the temporary lock status message 270 reads "It will unlock in 15 hours" indicating that the temporary locked status of the aerosol-generating device will expire in 15 hours.

Further, since the associated aerosol-generating device is now locked (e.g., one or more unlockable features thereof are temporarily locked), the lock status graphical element 251 now depicts a locked state as shown by a graphical representation of a locked padlock. Thus, the connected aerosol-generating device is locked, and if the unlockable feature is the ability to use the heating element to heat the aerosol-generating article to generate aerosol therefrom, then a user may not be able use the aerosol-generating device to use the heating element to heat the aerosol-generating article to generate aerosol therefrom.

Figure 7:
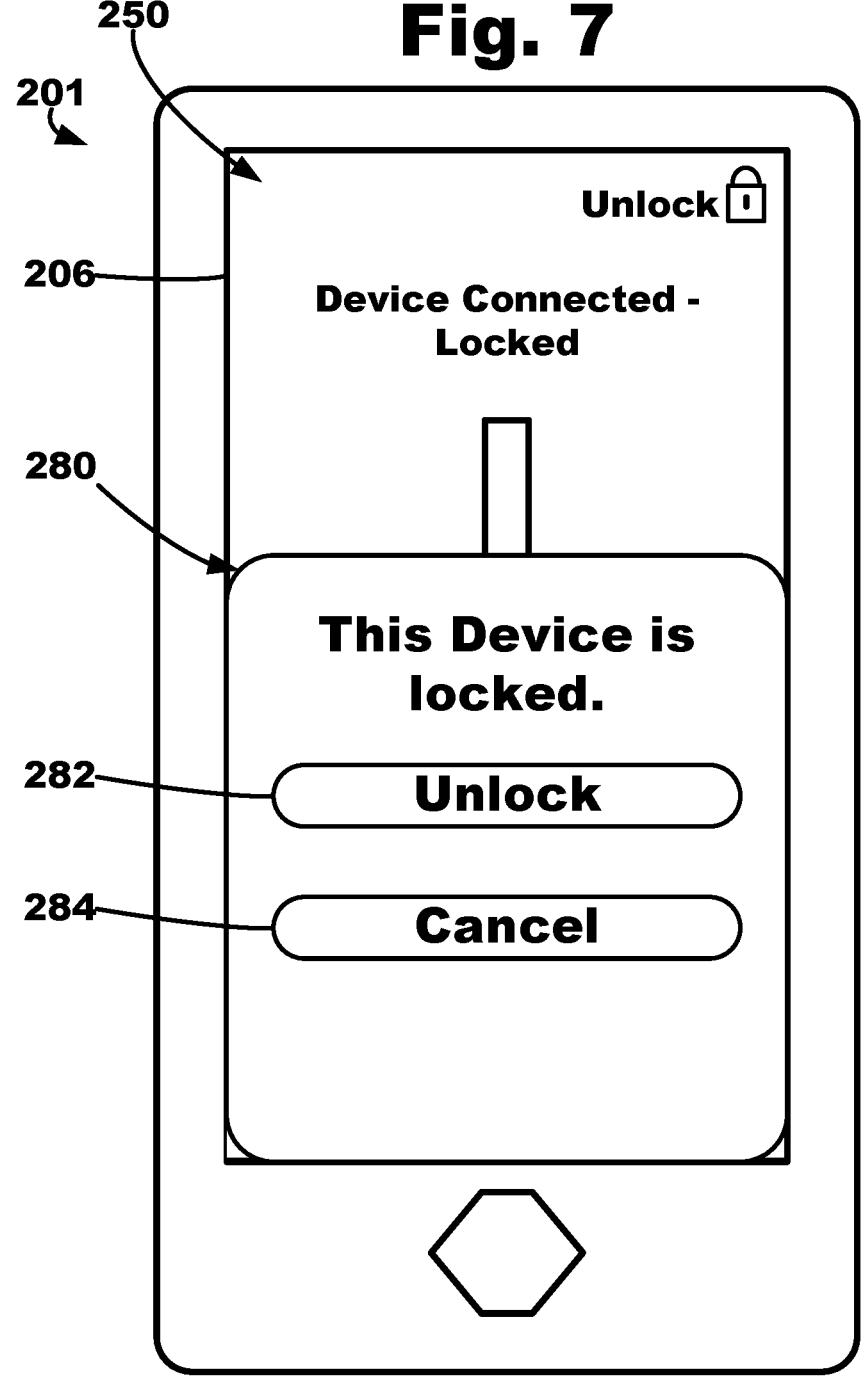

When an associated aerosol-generating device is locked, a user may desire to unlock the aerosol-generating device (e.g., unlock one or more unlockable features thereof). To do so, a user may select the lock status graphical element 251 or the text located proximate thereto that reads "Unlock." Upon selection of the lock status graphical element 251, an unlock graphical region 280 may be depicted in the graphical user interface 250 as shown in FIG. 7. A user may use the unlock graphical region 280 to select either an unlock initiation graphical element 282 (e.g., button) or a cancel unlock graphical element 284. Selection of the unlock initiation graphical element 282 will initiate the unlock processes as described herein. For example, an unlock request may be generated by the aerosol-generating device and the user interface device 201 and transmitted to a server in an attempt to acquire an unlock grant.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. Further, all scientific and technical terms used herein have meanings commonly used in the art unless otherwise specified. The definitions provided herein are to facilitate understanding of certain terms used frequently herein. As used herein, the singular forms "a", "an", and "the" encompass embodiments having plural referents, unless the content clearly dictates otherwise. As used herein, "or" is generally employed in its sense including "and/or" unless the content clearly dictates otherwise. The term "and/or" means one or all of the listed elements or a combination of any two or more of the listed elements. As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like. The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

The invention claimed is:

1. A method comprising:
   maintaining a database of user accounts and aerosol-generating devices associated with the user accounts, wherein each aerosol-generating device is only associable with a single user account;
   receiving an unlock request from a present aerosol-generating device to unlock an unlockable feature of the present aerosol-generating device, wherein the unlock request comprises unique user-identification information identifying a present user account to be associated with the present aerosol-generating device;
   determining whether the present aerosol-generating device is already associated with any user accounts in the database;
   transmitting an unlock grant to the present aerosol-generating device to unlock the unlockable feature in response to determination that the present aerosol-generating device is not already associated with any user accounts in the database; and
   updating the database to associate the present user account with the present aerosol-generating device in response to determination that the present aerosol-generating device is not already associated with any user accounts in the database.

2. The method of claim 1, wherein the aerosol-generating device comprises:
   a cavity to receive an aerosol-generating article;
   a heating element to heat the aerosol-generating article to generate aerosol therefrom; and
   a power supply operably coupled to the heating element, wherein the unlockable feature is the ability to use the heating element to heat the aerosol-generating article to generate aerosol therefrom.

3. The method of claim 1, wherein each user account of the database is only associable with an allowable number of aerosol-generating devices, wherein the method further comprises halting the transmission of the unlock grant and the update of the database if the present user account is already associated with the allowable number of aerosol-generating devices.

4. The method of claim 3, wherein the allowable number of aerosol-generating devices is less than or equal to 10.

5. The method of claim 1, wherein each user account of the database is associated with a person who is verified to be of legal age to use the aerosol-generating devices.

6. The method of claim 1, wherein the method further comprises:
   receiving a lock request from the present aerosol-generating device to re-lock the unlockable feature, wherein the re-lock request comprises the unique user-identification information identifying the present user account associated with the present aerosol-generating device;
   updating the database to disassociate the present user account from the present aerosol-generating device in response to reception of the lock request; and
   transmitting a lock grant to the present aerosol-generating device to re-lock the unlockable feature in response to reception of the lock request.

7. The method of claim 1, wherein the method further comprises transmitting a lock grant to the present aerosol-generating device to re-lock the unlockable feature in response to a user interface device not associated with the present user account attempting to configure the present aerosol-generating device.

8. The method of claim 1, wherein the method further comprises transmitting a warning message to a user interface device in response to the user interface device not associated with the present user account attempting to configure the present aerosol-generating device.

9. The method of claim 1, wherein the unlock request comprises:
   unique device-identification information identifying the aerosol-generating device; and
   time-limited nonce information corresponding to the unlockable feature.

10. The method of claim 9, wherein the unique device-identification is a serial number.

11. The method of claim 1, wherein the unlock grant is encrypted.

12. The method of claim 1, wherein the unlock grant is decryptable using a public key stored on the present aerosol-generating device.

13. A system for unlocking unlockable features of aerosol-generating devices comprising:
   a communication interface to transfer data to and from aerosol-generating devices; and
   a controller comprising one or more processors and operably coupled to the communication interface, wherein the controller is configured to:

maintain a database of user accounts and aerosol-generating devices associated with the user accounts, wherein each aerosol-generating device is only associable with a single user account;

receive an unlock request from a present aerosol-generating device to unlock the unlockable feature, wherein the unlock request comprises unique user-identification information identifying a present user account to be associated with the present aerosol-generating device;

determine whether the present aerosol-generating device is already associated with any user accounts in the database;

transmit an unlock grant to the present aerosol-generating device to unlock the unlockable feature in response to determination that the present aerosol-generating device is not already associated with any user accounts in the database; and update the database to associate the present user account with the present aerosol-generating device in response to determination that the present aerosol-generating device is not already associated with any user accounts in the database.

14. The system of claim 13, wherein the aerosol-generating device comprises:

a cavity to receive an aerosol-generating article;

a heating element to heat the aerosol-generating article to generate aerosol therefrom; and a power supply operably coupled to the heating element, wherein the unlockable feature is the ability to use the heating element to heat the aerosol-generating article to generate aerosol therefrom.

15. The system of claim 13, wherein each user account of the database is only associable with an allowable number of aerosol-generating devices, wherein the controller is further configured to halt the transmission of the unlock grant and the update of the database if the present user account is already associated with the allowable number of aerosol-generating devices.

16. The system of claim 15, wherein the allowable number of aerosol-generating devices is less than or equal to 10.

17. The system of claim 13, wherein each user account of the database is associated with a person who is verified to be of legal age to use the aerosol-generating devices.

18. The system of claim 13, wherein the controller is further configured to:

receive a lock request from the present aerosol-generating device to re-lock the unlockable feature, wherein the re-lock request comprises the unique user-identification information identifying the present user account associated with the present aerosol-generating device;

update the database to disassociate the present user account from the present aerosol-generating device in response to reception of the lock request; and transmit a lock grant to the present aerosol-generating device to re-lock the unlockable feature in response to reception of the lock request.

19. The system of claim 13, wherein the controller is further configured to transmit a lock grant to the present aerosol-generating device to re-lock the unlockable feature in response to a user interface device not associated with the present user account attempting to configure the present aerosol-generating device.

20. The system of claim 13, wherein the controller is further configured to transmit a warning message to a user interface device in response to the user interface device not associated with the present user account attempting to configure the present aerosol-generating device.

21. The system of claim 13, wherein the unlock request comprises:

unique device-identification information identifying the aerosol-generating device; and time-limited nonce information corresponding to the unlockable feature.

22. The system of claim 21, wherein the unique device-identification is a serial number.

23. The system of claim 13, wherein the unlock grant is encrypted.

24. The system of claim 13, wherein the unlock grant is decryptable using a public key stored on the present aerosol-generating device.

25. Computer program product comprising a non-transitory computer readable medium having program code portions stored thereon, the program code portions configured, when said program product is run on a computer or network device, to:

maintain a database of user accounts and aerosol-generating devices associated with the user accounts, wherein each aerosol-generating device is only associable with a single user account;

receive an unlock request from a present aerosol-generating device to unlock an unlockable feature of the present aerosol-generating device, wherein the unlock request comprises unique user-identification information identifying a present user account to be associated with the present aerosol-generating device;

determine whether the present aerosol-generating device is already associated with any user accounts in the database;

transmit an unlock grant to the present aerosol-generating device to unlock the unlockable feature in response to determination that the present aerosol-generating device is not already associated with any user accounts in the database; and update the database to associate the present user account with the present aerosol-generating device in response to determination that the present aerosol-generating device is not already associated with any user accounts in the database.

* * * * *